(12) United States Patent
Hintermeier (10) Patent No.: US 8,268,229 B2
(45) Date of Patent: Sep. 18, 2012

(54) INJECTION BLOW MOLDING MACHINE AND PROCESS FOR THE STRETCH BLOW MOLDING OF PLASTIC CONTAINERS

(75) Inventor: Martin Hintermeier, Mintraching (DE)

(73) Assignee: Krones AG, Neutraubling (DE)

( * ) Notice: Subject to any disclaimer, the term of this patent is extended or adjusted under 35 U.S.C. 154(b) by 446 days.

(21) Appl. No.: 12/376,988

(22) PCT Filed: Aug. 9, 2007

(86) PCT No.: PCT/EP2007/007048
§ 371 (c)(1),
(2), (4) Date: Mar. 18, 2010

(87) PCT Pub. No.: WO2008/017481
PCT Pub. Date: Feb. 14, 2008

(65) Prior Publication Data
US 2010/0187730 A1    Jul. 29, 2010

(30) Foreign Application Priority Data
Aug. 11, 2006 (DE) .......................... 10 2006 037 683

(51) Int. Cl.
*B29C 49/06* (2006.01)
(52) U.S. Cl. ........ 264/538; 264/537; 264/542; 264/532; 425/529
(58) Field of Classification Search .................. None
See application file for complete search history.

(56) References Cited

U.S. PATENT DOCUMENTS

| 3,357,046 A | 12/1967 | Pechthold |
| 4,372,910 A | 2/1983 | Stroup et al. |
| 6,450,795 B1 | 9/2002 | Fields et al. |

FOREIGN PATENT DOCUMENTS

| DE | 3124523 | 6/1982 |
| DE | 19737697 | 3/1999 |

OTHER PUBLICATIONS

English translation of DE 197 37 697, (Mar. 1999).*
Office Action for Chinese Patent Application No. 2007800338730, dated Sep. 5, 2011.
Office Action for Chinese Patent Application No. 2007800338730, 2011.

* cited by examiner

*Primary Examiner* — Monica A Huson
(74) *Attorney, Agent, or Firm* — Marshall, Gerstein & Borun LLP (57) ABSTRACT

An injection blow molding machine having an injection molding rotor including a plurality of injection molding units with individual split mold cavities for preforms, a transfer rotor, a blow molding rotor including a plurality of blow molds, and a removal rotor, essentially within a shared operating plane, and split mobile neck molding parts which fit into each blow mold and each mold cavity and which are transferred with a preform and removed with a stretch-blown bottle from the blow mold. In the process, each preform is transferred in the neck molding part into the blow mold.

17 Claims, 7 Drawing Sheets

INJECTION BLOW MOLDING MACHINE AND PROCESS FOR THE STRETCH BLOW MOLDING OF PLASTIC CONTAINERS

The present application claims the benefit of priority of International Patent Application No. PCT/EP2007/007048, filed Aug. 9, 2007 which application claims priority of German Patent Application No. 10 2006 037 683.8, filed Aug. 11, 2006. The entire text of the priority application is incorporated herein by reference in its entirety.

FIELD OF THE DISCLOSURE

The present disclosure relates to an injection blow molding machine of the type used for molding containers, such as plastic bottles, in bottling operations.

BACKGROUND

In an injection blow molding machine known from DE 197 37 697 A, two injection molding rotors are associated with the transfer rotor, said injection molding rotors being supplied with plasticized plastic material by a common extruder and comprising each a plurality of individual mold cavities. The total number of mold cavities in the two injection molding rotors corresponds to the number of blow molds on the blow molding rotor. One of the injection molding rotors is rotatingly driven, whereas the other is stationary. In the stationary injection molding rotor, the preforms are injection molded, whereas the rotating other injection molding rotor transfers the finished preforms one by one via the transfer rotor to the blow molding rotor. Prior to being transferred, the preforms are cooled in the injection molding rotor. The temperature or temperature distribution in each preform can be conditioned by tempering prior to the blow molding process. In the one-stage process carried out in the injection blow molding machine, the blow molding cycle time is substantially shorter than the cycle time required for producing and tempering the preform. Since the total number of mold cavities corresponds to the number of injection molds, it is difficult to optimally use the capacity of the blow molding rotor. In addition, a high amount of energy is required for the subsequent conditioning of the preforms.

In an injection blow molding machine known from DE 31 24 523 C, a central injection molding rotor, which comprises a plurality of mold cavity groups and which is supplied by a single extruder, has peripherally associated therewith a total number of four blow molding rotors for stretch blow molding the containers in groups.

U.S. Pat. No. 3,357,046 A discloses that stationary blow molds have associated therewith a rotating extruder arrangement, that the preforms are formed by severing them from a tube portion, and that they are filled immediately with the future container content and formed into containers.

In the injection blow molding machine known from DE 195 28 695 A, two injection molding units, which each comprise a plurality of mold cavities, are movable relative to injection molding cylinders in an injection molding station. The preform groups are removed from the mold cavities in the direction of their longitudinal axes and are then transferred in a direction transversely to the blow mold groups. The preform group can be transferred to and introduced in the blow mold group with a transfer tool comprising a plurality of neck molding parts, or the transfer tool is replaced, between the injection molding unit and the blow mold groups, by another blow-mold neck molding tool for dealing with a plurality of preforms simultaneously. The finished containers are removed from the neck molding tools and transported away.

SUMMARY OF THE DISCLOSURE

One aspect of the present disclosure to provide an injection blow molding machine and a process for stretch blow molding plastic containers, in particular bottles, by means of which a high output of high-quality plastic containers can be achieved continuously and in a single-stage process. Part of the object to be achieved is that the potential output capacity of the blow molding rotor should be optimally utilized in spite of the fact that the injection molding cycle time exceeds the blow molding cycle time.

The artifice of producing each preform in the neck molding part, transferring it in the neck molding part, forming the plastic container in the same neck molding part, and removing it also with the neck molding part as well as executing the motion steps substantially parallel to the operating plane, reduces the amount of technical equipment required and guarantees that neither the possibly sensitive preforms nor the plastic containers will be damaged when they are being manipulated. The neck molding parts are in addition to functional molding components also individual components of the transfer and removal system.

The process can take place continuously, since the neck molding parts have not only a forming function during the injection molding and stretch blow molding processes but also a transfer and removal function. This will substantially simplify the handling after the production of the preforms and after the stretch blow molding of the plastic containers and result in a high quality of the preforms and of the future plastic containers.

Although the rotors rotate continuously and synchronously in the injection blow molding machine, the output of containers from the blow molding rotor will not be limited by the longer injection molding cycle times, but the potential output capacity of the blow molding rotor can be optimally utilized, since, thanks to the excessive number of mold cavities according to an expedient embodiment, a number of preforms will continuously be produced which is large enough for allowing the blow molding rotor to operate with an optimum output capacity. In addition, each preform will be transferred to the blow mold comparatively quickly and has therefore an optimum temperature and/or temperature distribution for stretch blow molding. Furthermore, the period of time between production and stretch blow molding will be identical for each preform.

In spite of the continuous production of individual preforms with an injection molding cycle time which is longer than the blow molding cycle time for each individual preform, the blow molding rotor can, according to an expedient process variant, be operated with full output capacity, since the excessive number of preforms produced will compensate the difference between the blow molding cycle time and the injection molding cycle time.

According to an expedient embodiment, the number of injection molding units corresponds to the number of blow molds on the blow molding rotor, but each injection molding unit comprises more than only one mold cavity so as to obtain, in spite of the continuous operation, an excessive number of preforms, which is expedient for optimally utilizing the output capacity of the blow molding rotor. The control of each injection molding unit is structurally simple and is able to utilize the rotary movement of the injection molding rotor. At the transfer position, the mold cavity is open so that the finished preform is removed and transferred with the neck molding part; in the course of this process, the preform can consolidate or relax still further, since it is only in contact with the still warmed-up neck molding part and does not come into contact with any other manipulation element.

According to an expedient embodiment, each injection molding unit comprises three split injection molds provided in a star-shaped mode of arrangement on a shaft which is adapted to be intermittently rotated relative to the injection molding rotor. Each injection mold defines a mold cavity for producing a preform. During each full rotation of the injection molding rotor, the shaft executes only part of a rotation so as to offer a finished preform for transfer. Simultaneously, a holding pressure phase, which is important to the quality of the preform, is given for a further preform, and an injection molding process, which is not specially limited in time, can be carried out for still another preform. In this way, the injection molding cycle times and the blow molding cycle times are adjusted to one another in such a way that, in spite of the shorter injection molding cycle time, the full output capacity of the blow molding rotor can be utilized even in a continuous mode of operation.

In the injection molding rotor, each injection molding unit has associated therewith a separate plasticizing screw which rotates together with the injection molding rotor. In addition, at least one injection molding cylinder, which is adapted to be supplied by the plasticizing screw, is preferably provided. It is here possible to use an injection molding cylinder for each mold cavity, or to use a common injection molding cylinder for the mold cavities of the injection molding unit, said common injection molding cylinder being filled with plastic material from the plasticizing screw and used for introducing an exactly predetermined amount of material under high pressure into the mold cavity. An expedient separation of functions is here given, since the plasticizing screw guarantees the supply and the optimum plasticizing degree, whereas the injection molding cylinder guarantees the correct amount of material and the correct injection pressure.

With respect to a compact, low structural design, the plasticizing screws are arranged substantially parallel to the operating plane and radially to the axis of the injection molding rotor. They are centrally supplied with the plastic material by means of a common material distributor.

According to an expedient embodiment, each mold cavity is defined by an injection mold with two mold halves, the split, openable neck molding part and a mandrel. One of the mold halves and, preferably, the mandrel can be fixed relative to the shaft of the injection molding unit, whereas the other mold half is pivotably supported on said first mold half or in a mold carrier half. As is normally the case, means can be used for fixing or arresting the injection mold during the injection molding process.

It will be expedient when the neck molding part, which has to fulfil the injection molding and the blow molding function as well as the transfer and the removal function, is provided with a female thread so as to form a threaded neck, and, preferably, with at least one annular groove for forming a container neck holding ring, as is common practice e.g. in the case of PET bottles. Neck molding parts having a different shape can, however, be used as well, depending on the type of plastic container produced. Neck molding parts having a smooth inner wall and/or bead forming parts for other closure means can, for example, be used as well.

According to an expedient embodiment, the neck molding part carries two guide cones which are arranged one on top of the other on the outer side of said neck molding part. An upper guide cone is provided for applying thereto the transfer and removal elements, whereas a lower guide cone serves to position and fix the neck molding part in the mold cavity and in the blow mold, respectively.

According to a particularly expedient embodiment of the injection blow molding machine, the transfer rotor and the removal rotor are coaxially combined in a single rotor such that they are positioned one on top of the other. This will reduce the amount of space required in the injection blow molding machine. An important aspect is here that cam control means are provided for the transfer and removal elements, said cam control means controlling an alternate overtaking function for the transfer and removal elements. It will be expedient when the transfer and removal elements consist of pairs of clamps that are extendable and retractable as well as possibly pivotable; each of said clamps is either spring biased and opens and closes automatically when applied to the respective element, or the clamps are adapted to be opened and closed in a controlled mode.

In an expedient embodiment of the injection blow molding machine having an optimum output capacity, the blow molding rotor has provided thereon eight blow molds, the injection molding rotor has provided thereon eight injection molding units comprising each three injection molds, the transfer rotor has provided thereon four transfer elements, and the removal rotor has provided thereon four removal elements. The rotors are driven such that the mold cavity located at the transfer position, each clamp and each blow mold move essentially at the same circumferential speed.

In addition, it will be expedient to provide control means, preferably cam control means on the transfer and removal rotor, for opening or closing each neck molding part. Each neck molding part will not be opened until the finished plastic container can be removed, and after this removal it will be closed immediately for insertion into the mold cavity. It is even possible to introduce the neck molding part into the open mold cavity in the open condition and to close it only when the mold cavity is being closed.

For guaranteeing a neat transfer of the finished plastic containers to a discharge conveyor, it will be expedient to provide a mandrel for temporarily securing and transporting away each plastic container, said mandrel being insertable, at least to a certain degree, into the container neck and expandable in said container neck, when the neck molding part delivering the plastic container is opened. It would, however, also be possible to take hold of the bottom of the container, or to grasp the container in some other way as soon as the neck molding part is opened.

According to an advantageous process variant, each mold cavity is first transferred, during a full rotation of the injection molding rotor, from an injection position by a third of a turn to a holding pressure position. This is followed by a holding pressure and consolidation phase of the plastic material in the mold cavity so as to optimally form the preform. The mold cavity can, but need not, temporarily stop at the holding pressure position. During the next full rotation of the injection molding rotor, the mold cavity is moved by a third of a turn to a transfer position and opened in such a way that, when meeting a transfer element, the preform, with the closed neck molding part, will be removed from the mold cavity and rapidly transferred to the blow mold. During the next full rotation of the injection molding rotor, the mold cavity will be closed again and transferred to the injection position. In the injection position, the closed and locked mold cavity can temporarily be stopped at the rotating injection molding rotor while the latter continues to rotate.

According to another process variant the respective neck molding part is transferred from the mold cavity and removed from the blow mold by a clamp of a combined transfer and removal rotor. The combined rotor has provided thereon a respective pair of clamps, said pair of clamps being controlled in the direction of rotation of the rotor in such a way that a clamp constituting the rear clamp in the direction of circulation will overtake the other, front clamp of the pair once during the transfer process and also once during the removal process, said overtaking taking place between the positions of the injection molding and blow molding rotors. By means of this overtaking step, the initially leading clamp with the neck molding part and the preform held therein is, during the transfer process, overtaken by the empty clamp, which introduced the neck molding part into the mold cavity, so that the empty clamp will then constitute the leading clamp and remove the closed neck molding part with the finished plastic container from the blow mold, before the then trailing clamp with the preform will introduce the preform with the neck molding part. In a similar way, the initially leading clamp with the neck molding part and the plastic container is overtaken by the empty clamp, which transferred the preform into the blow mold, between the blow molding rotor and the injection molding rotor so that the then leading empty clamp will, in turn, remove the neck molding part with the preform from the mold cavity, before the clamp with the neck molding part, which then no longer contains the plastic container, will introduce said neck molding part into the mold cavity. The overtaking processes can be controlled easily, but they allow the use of a combined transfer and removal rotor instead of two separate and separately driven and controlled transfer and removal rotors.

Finally, the process according to the present disclosure is so conceived that, at least at the injection and transfer positions of each mold cavity, the rotation of the injection molding unit is temporarily interrupted at the injection molding rotor which continues to rotate, so that the injection process and the transfer process take place in a neatly controlled manner. It is, however, also imaginable that the rotation of the injection molding unit is only slowed down temporarily or even continued continuously.

It will be expedient to assign still another function to the neck molding part in the blow mold insofar as said neck molding part is used for attaching thereto the blowing nozzle. This means that the blowing nozzle is brought into sealing engagement with the neck molding part; to this end, appropriate sealing measures are taken at the blowing nozzle and/or at the neck molding part, without any necessity of using the preform for this purpose and possibly damaging it in so doing. This results in an increased flexibility of the blow molding process.

BRIEF DESCRIPTION OF THE DRAWINGS

Embodiments of the subject matter of the present disclosure and of the process are explained on the basis of the drawings, in which.

DETAILED DESCRIPTION OF THE PREFERRED EMBODIMENT

Figure 1:
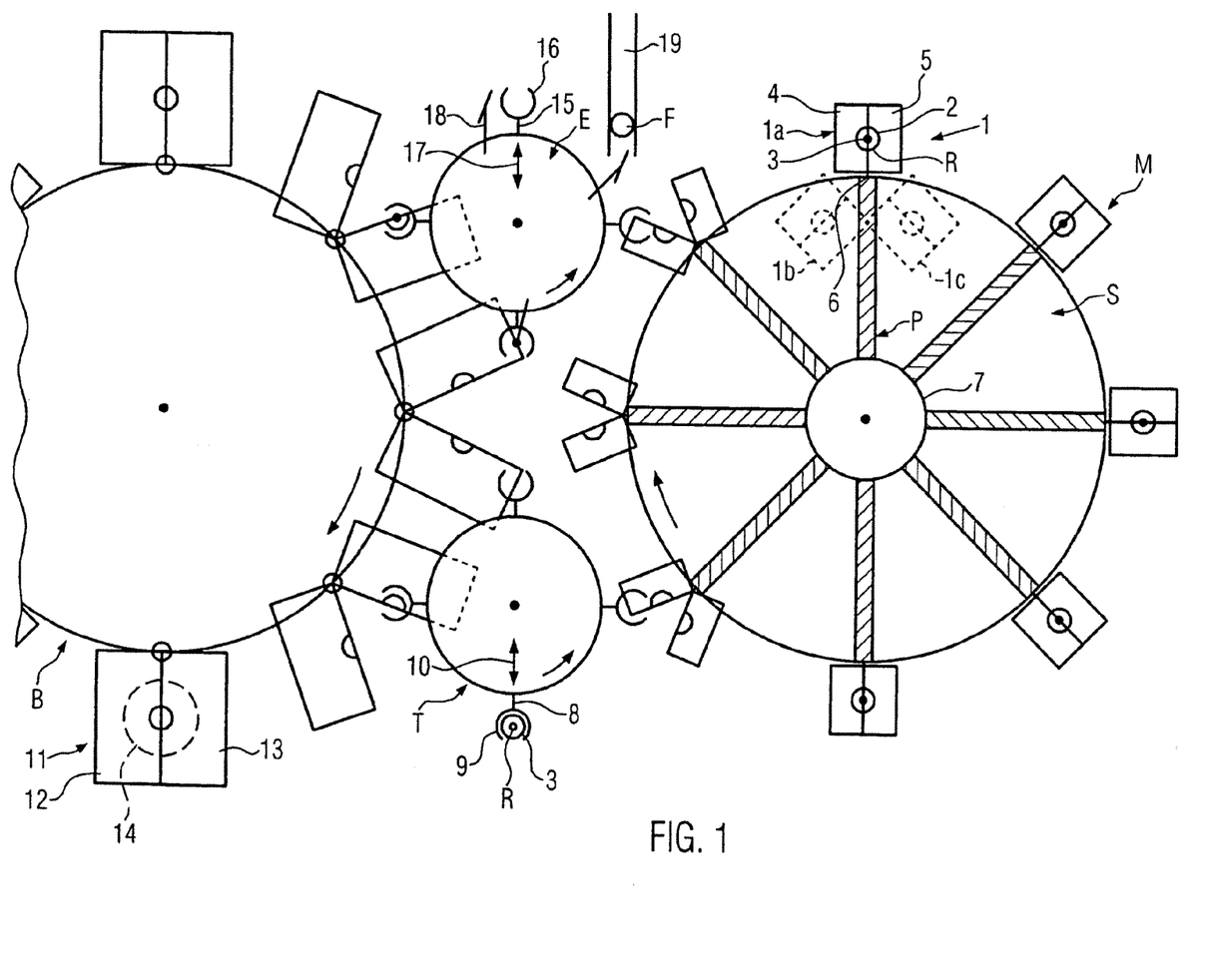
FIG. 1 shows a schematic top view of rotor components of an injection blow molding machine (first embodiment)

FIG. 1 shows, without specifying in detail drive units and auxiliary equipment, an injection molding rotor S, a blow molding rotor B spaced apart from said injection molding rotor S, and transfer and removal rotors T, E cooperating with the rotors S, B, of an injection blow molding machine M used for producing from preforms R plastic containers F, in particular PET bottles. The rotors S, B, T, E operate essentially in a shared operating plane, the axes of the rotors extending essentially at right angles to said plane. The injection molding rotor S has provided thereon e.g. eight injection molding units 1 which are arranged at uniform, circumferentially spaced intervals. Also the blow molding rotor B is provided with eight blow molds 11. Each transfer and removal rotor T, E comprises four transfer and removal elements 8, 9, 15, 16, 18, respectively.

In the embodiment shown in FIG. 1, each injection molding unit 1 comprises three injection molds 1a, 1b and 1c which are arranged in a star-shaped mode of arrangement on a shaft 6 on the injection molding rotor S and which each define a mold cavity 2 for producing a preform R. Each injection molding unit 1 has associated therewith a plasticizing screw P in the injection molding rotor S. The plasticizing screws P rotate together with the injection molding rotor, they are arranged in a horizontal and substantially radial mode of arrangement and they are supplied by a central material distributor 7. Each injection mold 1a, 1b, 1c is divided in a plane that extends parallel to the axis of the injection molding rotor S so that two mold halves 4, 5 are formed, which are adapted to be pivoted relative to one another, possibly in a mold carrier. An important part of the mold cavity 2 is a neck molding part 3, which is divided as well.

The transfer elements 8, 9 on the transfer rotor T are clamps used for gripping only the respective neck molding part 3 and adapted to be extended and retracted at least in the direction of a double arrow 10. The clamps can be spring biased and open or close automatically when applied to the neck molding part 3, or they are opened or closed in a controlled mode.

Also each blow mold 11 on the blow molding rotor B is divided and comprises two mold halves 12, 13 as well as a bottom mold 14 which is only indicated by a broken line. Each blow mold 11 cooperates with a blowing nozzle which is not outlined in FIG. 1.

Also the removal elements 15, 16 on the removal rotor E are clamps, which are adapted to be moved to an fro at least in the direction of a double arrow 17 and which are similar to the clamps provided on the transfer rotor T. In addition, mandrels 18 are provided whose purpose and function will be explained hereinbelow. The removal rotor E cooperates with a discharge unit 19 (e.g. a removal belt or an air conveyor) for the finished plastic containers F. The directions of rotation of the rotors are marked by arrows.

Figure 2:
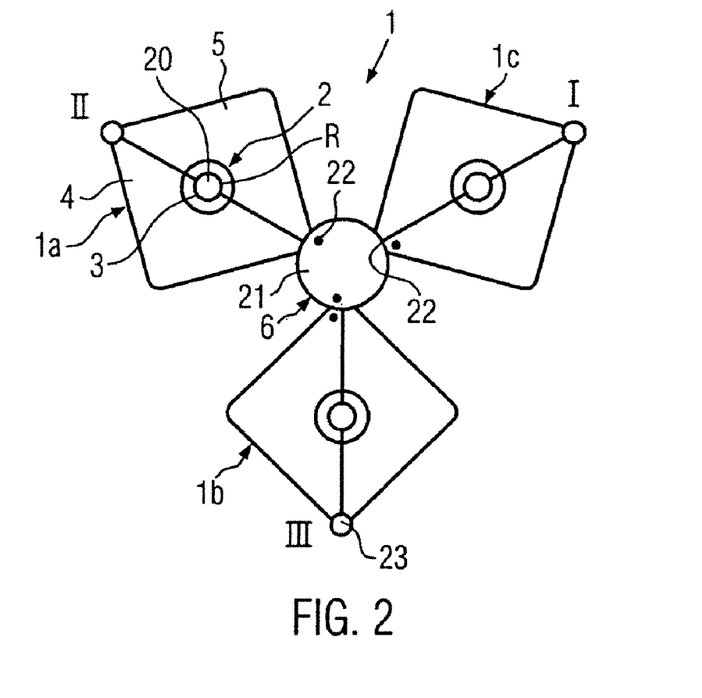
FIG. 2 shows a schematic top view of an injection molding unit of an injection molding rotor of the injection blow molding machine according to FIG. 1 (and FIG. 6)

The three injection molds 1a, 1b, 1c are adapted to be rotated by means of the shaft 6 in FIGS. 1 and 2 by a third of a turn relative to the injection molding rotor S while said injection molding rotor rotates one full turn. In this way, each injection mold 1a, 1b, 1c is advanced during three full rotations of the injection molding rotor S between an injection position I, a holding pressure position II and a transfer position III. This rotation can take place continuously or intermittently.

While the rotors rotate continuously and while, making use of the full output capacity, the individual plastic containers F are stretch blow molded and formed in the blow molding rotor B, e.g. a number of preforms R exceeding the number of blow molds 11 on the blow molding rotor B is produced in the injection molding rotor S. Each preform R dwells at the injection molding rotor S for e.g. more than one full rotation, viz. e.g. for three full rotations, so that, in spite of the fact that the cycle time for the stretch blow molding of the plastic containers F is, as is usually the case, shorter than the cycle time for the injection molding of the preform, the output capacity of the blow molding rotor B will not be limited by the longer cycle time for the injection molding of the preform.

FIG. 2 illustrates the arrangement of the three injection molds 1a, 1b, 1c on the shaft 6. In FIG. 2, it is additionally indicated that each of the injection molds, which are approximately square when seen from above, could be divided diametrically into the mold halves 4, 5. The shaft 6 is anchored in the injection molding rotor S and is driven through a control 21 stepwise or continuously in a ratio of 1:3 to the rotation of the injection molding rotor S, i.e. during three full rotations of the injection molding rotor S, the injection molding unit 1 executes a 360° rotation over three thirds of a rotation. In the course of this process, each mold cavity 2 is opened at the transfer position III so that the preform R with the closed neck molding part 3 is ready for removal from the mold cavity 2. At least one of the mold halves 4, 5 can be fixedly attached to the shaft 6, whereas the other mold half can be pivotably supported on said first-mentioned mold half or on a mold carrier which is not shown, The rotation control means 21 of the shaft 6 can also be implemented such that it controls the opening and closing movements of the injection molds 1a, 1b, 1c.

Figure 3:
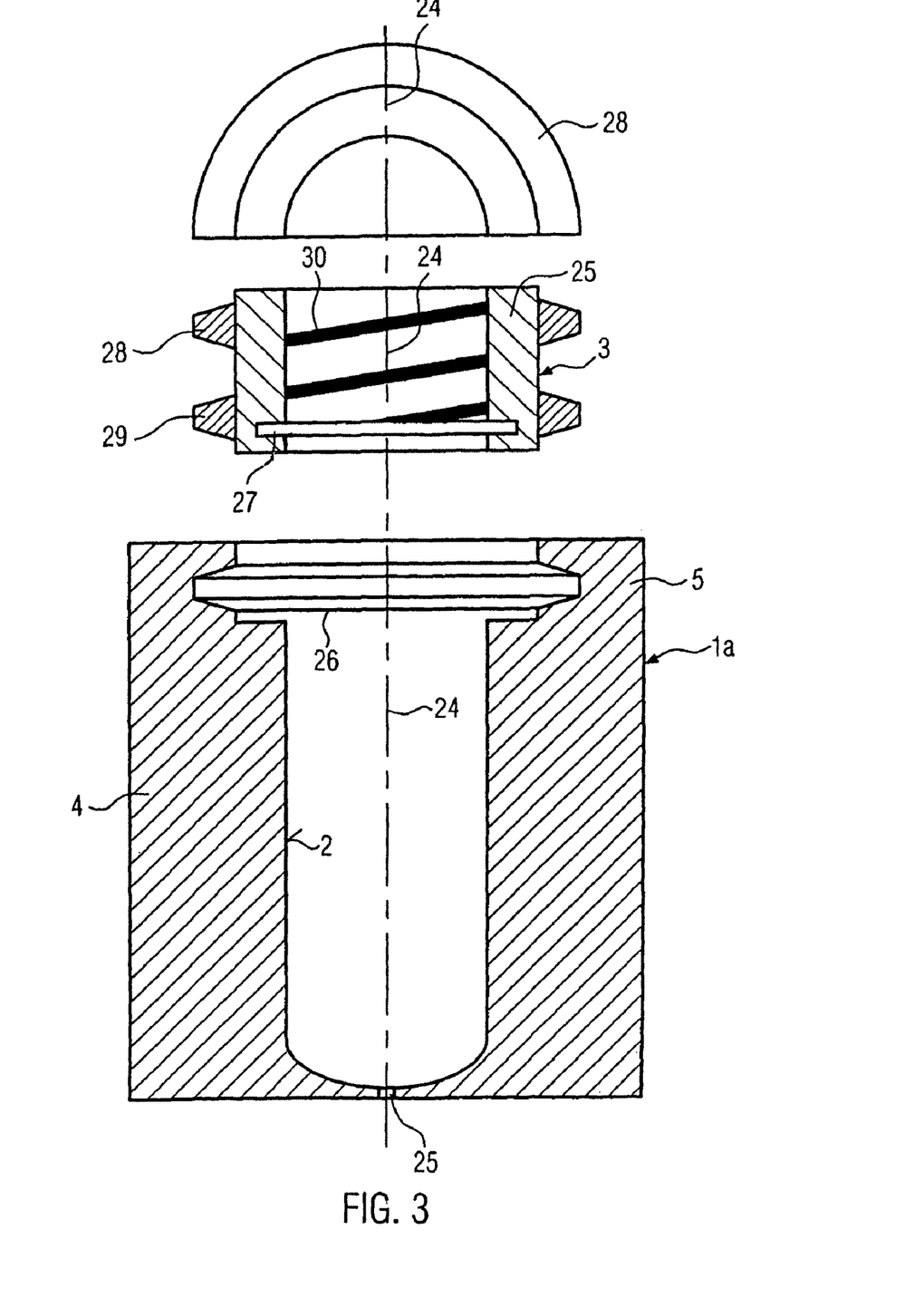
FIG. 3 shows an axial section of a view, part of which is a top view, of an injection mold of the injection molding units according to FIG. 1.

FIG. 3 shows a section through the injection mold 1a at right angles to the mold parting plane 24. The mold cavity 2 in the mold halves 4, 5, is implemented in the shape of the preform and has an injection opening 25 at the bottom. In an upper area of the mold cavity 2, a circumferentially extending conical reception means 26 is formed, which serves to position and fix the neck molding part 3. Also the neck molding part 3 is adapted to be opened in the mold parting plane 24 and comprises two shells 25 provided with a female thread 30 and e.g. a circumferentially extending annular groove 27 (for the holding ring of the container neck). On the outer circumference of the shells, an upper guide cone 28 for applying the transfer and removal elements, and a lower guide cone 29 for insertion in the groove 26 (and a corresponding groove in the respective blow mold 11 or in a blow mold carrier) are formed one on top of the other.

The neck molding part 3 serves, on the one hand, for forming the outlet area of the preform R and, on the other hand, for forming the plastic container F, and in addition for transferring the preform and for removing the plastic container. Another function of the neck molding part 3 can be that it cooperates with the blowing nozzle of the blow mold, said blowing nozzle being attached directly to the neck molding part 3.

Figure 4:
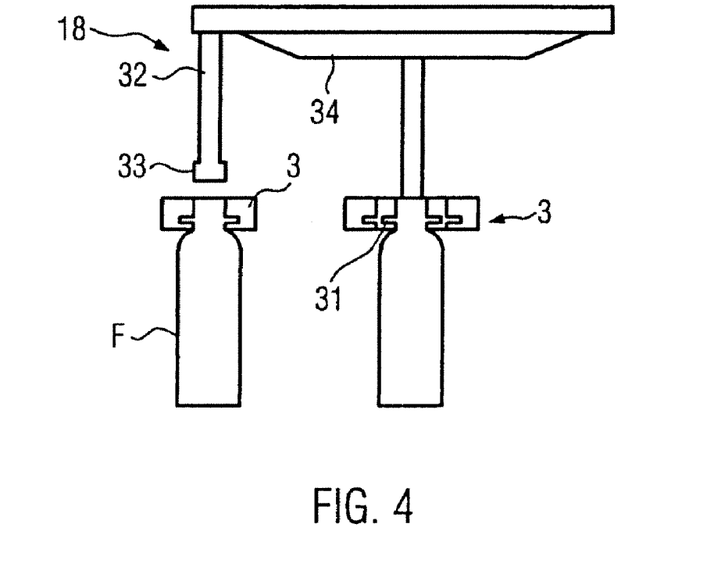
FIG. 4 shows a schematic side view of a process step during the removal of plastic containers from the blow molding rotor according to FIG. 1.

FIG. 4 shows the course of action for removing the finished plastic containers F from the blow molding rotor R. Each plastic container F is removed with the closed neck molding part 3 from the blow mold and moved along the removal rotor E to the discharge conveyor 19. In the course of this movement, the removal element 16 holds the closed neck molding part 3 until the plastic container F has been aligned with a mandrel 18, which moves as well and which has arranged thereon an expandable head 33 at the lower end of its shaft 32. The head 33 is introduced by means of a cam control 34 into the neck of the plastic container F and expanded until the plastic container F is suspended from the mandrel 18. Via cam control means which are not specified in detail, the neck molding part 3 is simultaneously opened, e.g. by the removal element 16, until also the holding ring 31 of the plastic container F is released and the plastic container can be transported away. The neck molding part 3 is then advanced still further in its open condition, or it is closed again and then reintroduced into a mold cavity 2 of an injection mold 1a, 1b, 1c.

Figure 5:
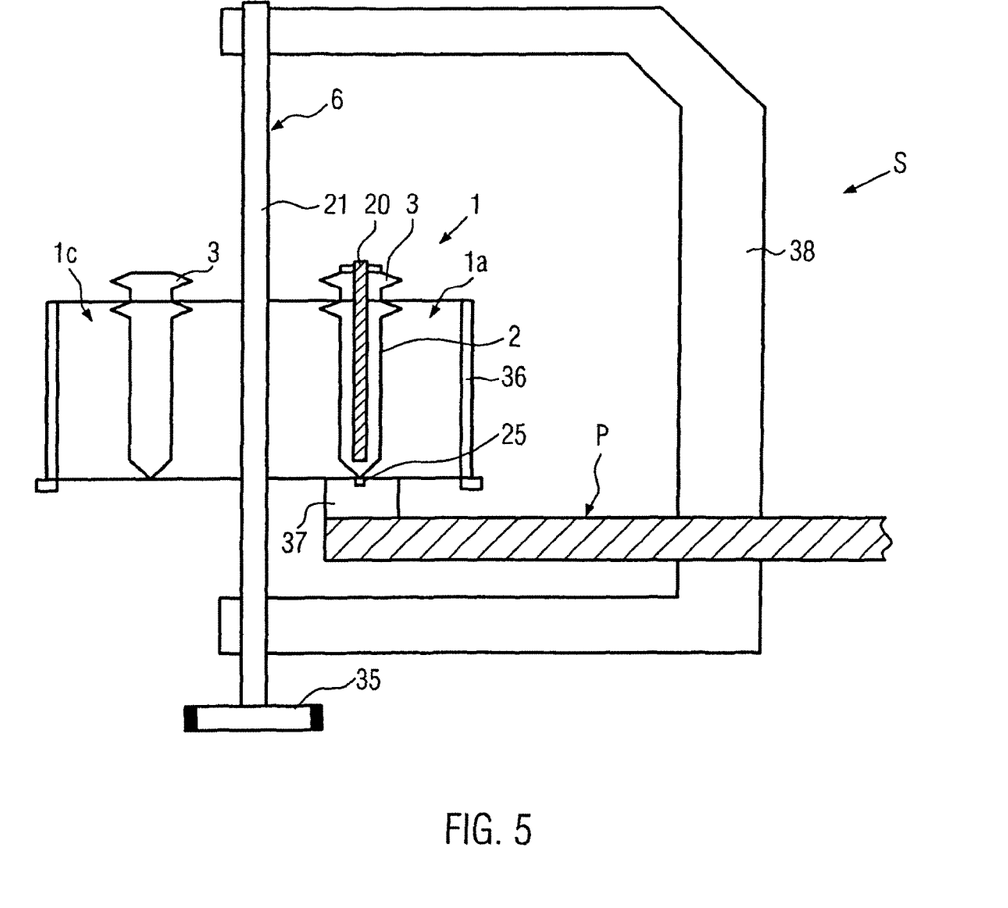
FIG. 5 shows a schematic side view of a detail of the injection molding rotor in FIG. 1 and FIG. 6, respectively.

FIG. 5 illustrates a detail of the injection molding rotor S with the shaft 6, which is rotatably supported in a portal 38 and which is adapted to be rotatingly driven via a control gear 35. The shaft 6 carries mold carriers 36 for the injection molds 1a, 1b, 1c of the injection molding unit 1. FIG. 5 shows of each injection mold the neck molding part 3 in the mold cavity 2 and the injection opening 25 of the mold cavity, the injection opening of the injection mold 1a being in alignment with an injection element 37 of the plasticizing screw P. Furthermore, a mandrel 20 is inserted into the neck molding part 3 from above. For producing the preform R, the plasticized plastic material is injected into the mold cavity 2 either from the plasticizing screw or by making use of an injection molding cylinder 42 which will be explained on the basis of FIG. 8. The rotation of the shaft 6 can temporarily be interrupted during this injection process, whereas the injection molding rotor S continues to rotate. The injection molding cylinder, which is not shown, could then rotate together with the injection mold 1a about the axis of the shaft 6 until the injection mold 1a has reached the holding pressure position II. Then, the shaft 6 starts rotating again until the injection mold 1a has finally reached the transfer position III in FIG. 2 where it will be opened.

Figure 6:
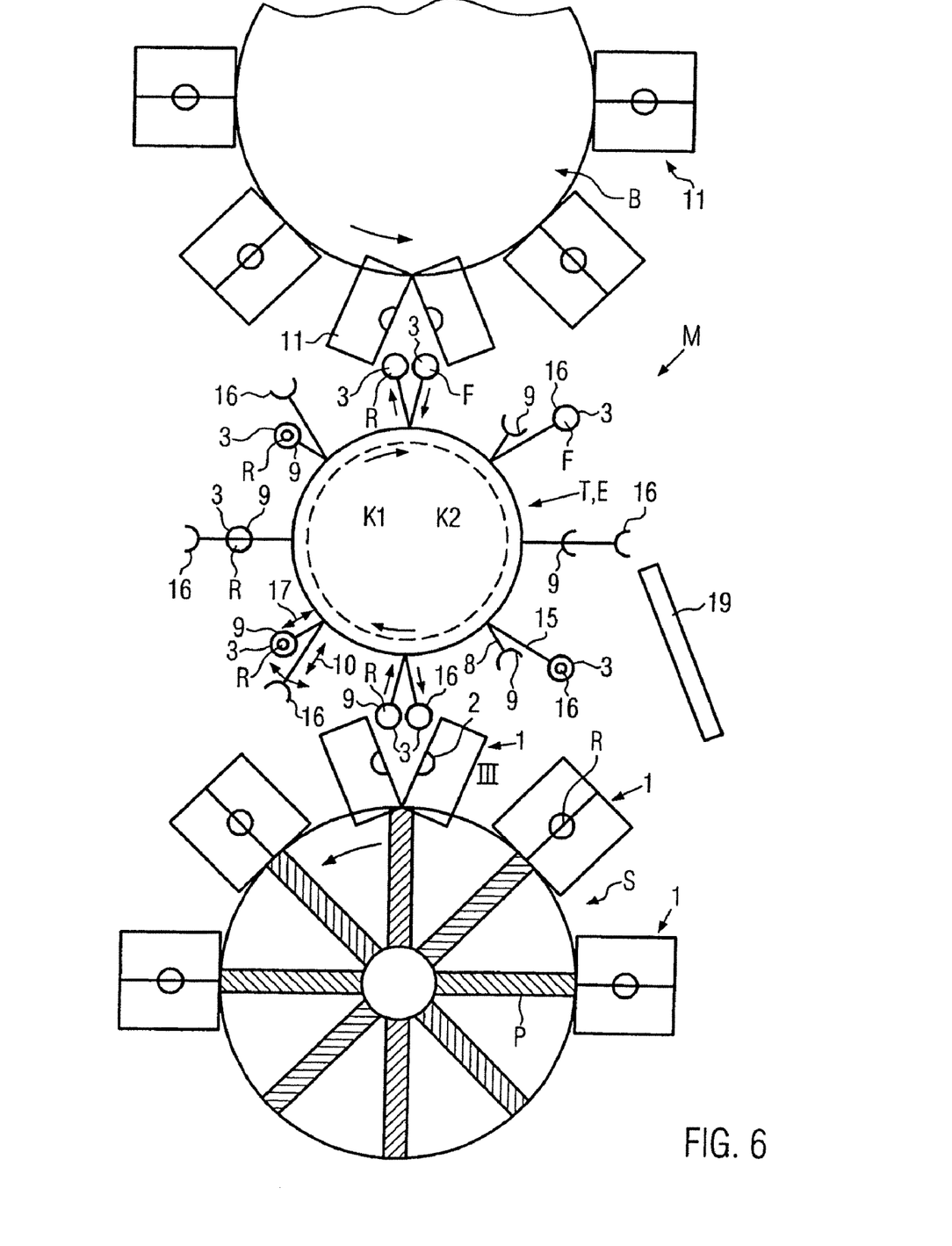
FIG. 6 shows a schematic top view of a second embodiment of the injection blow molding machine.

FIG. 6 illustrates analogously to FIG. 1 a top view of a second embodiment of the injection blow molding machine, which is characterized in that the transfer and removal rotors T, E of FIG. 1 are combined, one on top of the other, in a rotor T, E provided with a total of eight pairs of transfer and removal elements 8, 9, 15, 16 and the mandrels 18 (not shown); the transfer and removal elements can not only be extended and retracted, but they may also be pivotable. In the combined transfer and removal rotor, cam control means K1, K2 are provided, with the aid of which a respective overtaking function can be executed, when the elements move from the injection molding rotor S to the blow molding rotor B and vice versa.

The transfer and removal elements 9, 16 are e.g. a respective pair of clamps. When the overtaking function is executed, e.g. during the transfer from the injection molding rotor S to the blow molding rotor B, the clamp 16, which is first the trailing clamp in the direction of circulation, overtakes the leading clamp 9 once due to the function of the cam control means K1, so that the clamp 16 will finally arrive before the clamp 9 at the open blow mold 11 in the direction of circulation and remove the finished plastic container F with its neck molding part 3, before the then trailing clamp 9 transfers a neck molding part 3 and a preform R to the blow mold 11.

In a similar way, the cam control means K2 controls an overtaking function once on the removal path between the blow molding rotor B and the injection molding rotor S. The clamp 9, which first constitutes the trailing clamp in the direction of circulation, overtakes the other clamp 16 belonging to the pair of clamps and holding the neck molding part 3 with the plastic container F, so that the empty clamp 9 will arrive at the open mold cavity 2 as the leading clamp for removing the neck molding part 3 with the preform R, before the clamp 16, which then no longer carries the plastic container F, arrives, with the neck molding part 3, at the mold cavity 2. Each plastic container F is in this case removed by the mandrel 18 (not shown) when the neck molding part 3 has been opened, and is then supplied to the discharge conveyor 19. The neck molding part 3 is closed, e.g. by the clamp 16, before it is introduced into the open injection mold 1a, 1b, 1c of the injection molding unit 1, said injection mold occupying the transfer position III.

Figure 7:
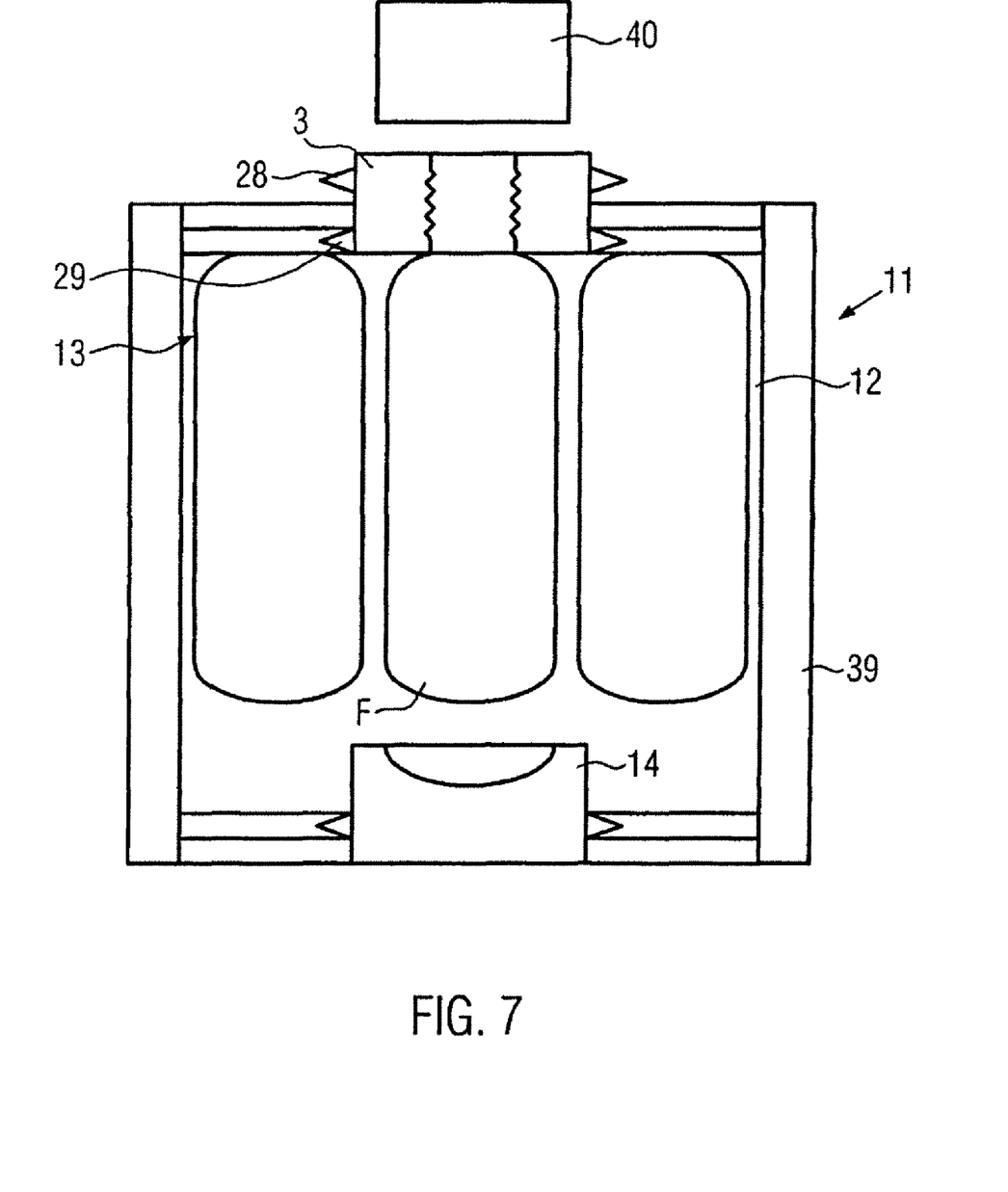
FIG. 7 shows a schematic side view, part of which is a sectional view, of a blow mold of the blow molding rotor in FIG. 1 and FIG. 6, respectively.

FIG. 7 illustrates schematically a blow mold 11 with a blow mold carrier 39 and the blow mold halves 12, 13 in the open condition. Also the bottom mold 14 is positioned in the blow mold carrier 39, and so is the neck molding part 3 with the guide cone 29. The blowing nozzle 40 is attached directly to the neck molding part 3 as soon as said neck molding part 3 has been closed and locked. For this purpose, suitable connection and sealing means, which are not emphasized in detail, can be provided on the blowing nozzle 40 and/or on the neck molding part 3.

Figure 8:
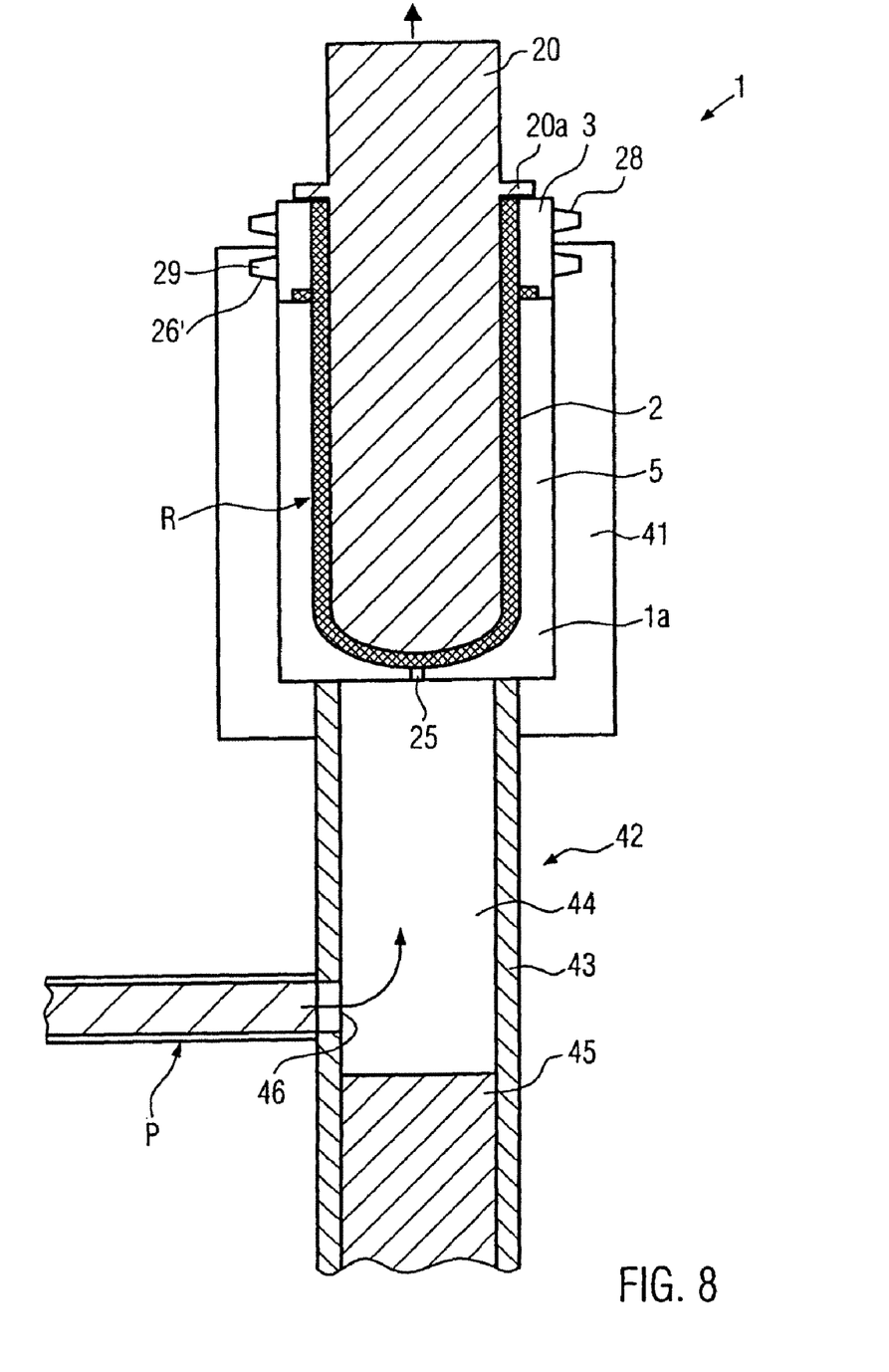
FIG. 8 shows an axial section of an injection mold with an injection molding cylinder and a plasticizing screw of the injection molding rotor in FIG. 1 and FIG. 6, respectively.

Finally, FIG. 8 illustrates once more the closed injection mold 1a of the injection molding unit 1 in the injection molding rotor S during cooperation with the plasticizing screw P and the injection molding cylinder 42 for filling the mold cavity 2 through the injection opening 25 with plasticized plastic material and producing the preform R. The mold halves (only the mold half 5 is indicated) of the injection mold 1a are contained in a mold carrier 41; in this embodiment, the guide cone 29 of the neck molding part 3 cooperates with this mold carrier 41. For securing the guide cone 29 in position, an appropriate reception groove 26' is formed in the mold carrier 41. The upper guide cone 28 for the transfer and removal elements is exposed. The mandrel 20 is introduced into the mold cavity 2 until an annular flange 20a of the mandrel 20 rests on the upper side of the neck molding part 3.

The injection molding cylinder 42 contains an e.g. hydraulically operable dosing piston 45 in a cylinder tube 43 which is introduced in the mold carrier 41 and which is in sealing engagement with the lower surface of the injection mold 1a. The dosing piston 45 is retracted to a lower charging position before the plasticizing screw P introduces plasticized plastic material into a dosing chamber 44 through an inlet 46. Subsequently, the piston 45 is displaced upwards until it closes the inlet 46 and presses a preset amount of plastic material into the mold cavity 2. In the course of this process, the inlet 46 is temporarily sealed off until the piston 45 is moved downwards later on. The injection molding cylinder 42 can remain attached until the holding pressure position II of the injection mold 1a has been reached. Then, the mold carrier 41 is either slightly raised, or the injection molding cylinder 42 is slightly lowered, before the rotary movement of the injection mold 1a about the shaft 6 is continued.

Due to the continuous process flow, the period of time required for each preform until the respective preform is introduced in the blow mold after its production is equal. The dwell time of the preform in the injection molding rotor S is sufficiently long for allowing optimum forming, holding of the pressure and stress relieving and for achieving an optimum temperature or temperature distribution in the preform. If necessary, cooling or thermal conditioning is executed in this phase or in a later phase. Such thermal conditioning of the preform may also be executed while the preform moves along the transfer rotor T and into the blow mold. The preform R does not come into contact with other manipulating elements at any time, since the neck molding part 3 has to fulfil not only forming functions during the injection and stretch blow molding processes but also transfer and removal functions and possibly even the connection function for the blowing nozzle 40 and the attachment function for the mandrel 20. During each blow molding process, stretching and pre-blowing is executed, as usual, when the process has begun, whereas final blowing is carried out subsequently while the blow molding rotor rotates. Cam guides or other aids can be provided for opening and closing the clamps. Since the blow molding rotor and the injection molding rotor are capable of rotating at essentially the same speed, also the movement of the transfer and removal rotors is uniform and quiet. At least theoretically, eight different blow molds could be installed, which allow the production of differently dimensioned plastic containers, since each blow mold is so to speak supplied from a separate injection molding unit 1 which produces the preform in the blow mold according to the requirements in question.

Broader variations are additionally possible when not only eight different blow molds but also different thread inserts (neck molding parts) are used. Taking all this into account, a much more flexible production is possible, since also particular (peculiar) shapes can be produced (e.g. angular containers from angular preforms).

I claim:

1. An injection blow molding machine for plastic containers, comprising at least one injection molding rotor having a plurality of injection molding units which are suppliable with plasticized plastic material and which include individual, splited mold cavities for preforms, a transfer rotor equipped with controlled transfer elements and used for transferring the individual preforms to a blow molding rotor including a plurality of blow molds for stretch blow molding the plastic containers, a removal rotor equipped with controlled removal elements, the injection molding rotor, transfer rotor, blow molding rotor, and removal rotor being arranged in a substantially common operating plane, each mold cavity in the injection molding rotor being partly delimited by a split neck molding part which fits into each blow mold of the blow molding rotor, and wherein during use of the respective transfer element, a preform can, together with the neck molding part, be removed from a mold cavity substantially parallel to the operating plane and introduced in a blow mold, and upon use of a removal element, a container can, together with the neck molding part, be removed from the blow mold substantially parallel to the operating plane, and the neck molding part, which then no longer contains the container, can be reintroduced in a mold cavity, and wherein a plasticizing screw rotates together with the injection molding rotor.

2. An injection blow molding machine according to claim 1, wherein the plasticizing screws extend substantially parallel to the operating plane and are arranged radially to the axis of the injection molding rotor, the plasticizing screws being connected to a material distributor which is common to all the plasticizing screws.

3. An injection blow molding machine according to claim 1, wherein each mold cavity is defined by an injection mold with two mold halves, the split neck molding part and a mandrel, one of the mold halves being fixed relative to a shaft associated with the mandrel, and that the other mold half being pivotable directly on one of the first mold half or in a mold carrier half.

4. An injection blow molding machine according to claim 1, wherein the split neck molding part is provided with a female thread.

5. An injection blow molding machine according to claim 1, wherein the neck molding part carries two guide cones which are arranged one on top of the other on the outer side of said neck molding part.

6. An injection blow molding machine according to claim 1, and the blow molding rotor is provided with eight blow molds, the injection molding rotor is provided with eight injection molding units, each comprising three injection molds, the transfer rotor is provided with four transfer elements, and the removal rotor is provided with four removal elements.

7. An injection blow molding machine according to claim 1, wherein at least one injection molding cylinder which is adapted to be supplied by the plasticizing screw is associated with each injection molding unit in the injection molding rotor.

8. An injection blow molding machine according to claim 4, and wherein the two guide cones comprise an upper guide cone for the transfer and removal elements and a lower guide cone for one of an injection mold carrier or a blow mold carrier provided with a conical guide groove that matches with said lower guide cone.

9. An injection blow molding machine for plastic containers, comprising at least one injection molding rotor having a plurality of injection molding units which are suppliable with plasticized plastic material and which include individual, splited mold cavities for preforms, a transfer rotor equipped with controlled transfer elements and used for transferring the individual preforms to a blow molding rotor including a plurality of blow molds for stretch blow molding the plastic containers, a removal rotor equipped with controlled removal elements, the injection molding rotor, transfer rotor, blow molding rotor, and removal rotor being arranged in a substantially common operating plane, each mold cavity in the injection molding rotor being partly delimited by a split neck molding part which fits into each blow mold of the blow molding rotor, and wherein during use of the respective transfer element, a preform can, together with the neck molding part, be removed from a mold cavity substantially parallel to the operating plane and introduced in a blow mold, and upon use of a removal element, a container can, together with the neck molding part, be removed from the blow mold substantially parallel to the operating plane, and the neck molding part, which then no longer contains the container, can be reintroduced in a mold cavity; wherein the number of injection molding units on the injection molding rotor comprising more than one mold cavity corresponds to the number of blow molds on the blow molding rotor, and further comprising a control means with the aid of which only one mold cavity at a time can be moved relative to the injection molding rotor to an open transfer position, provided for each injection molding unit; wherein the number of injection molding units on the injection molding rotor comprising more than one mold cavity corresponds to the number of blow molds on the blow molding rotor, and further comprising a control means with the aid of which only one mold cavity at a time can be moved relative to the injection molding rotor to an open transfer position, provided for each injection molding unit; wherein each injection molding unit comprises three split injection molds provided in a star-shaped mode of arrangement on a shaft which extends substantially parallel to the axis of the injection molding rotor and which is adapted to be intermittently rotated relative to the injection molding rotor, and, when the injection molding rotor executes a full rotation between predetermined positions, the shaft is adapted to execute only part of a rotation, one position being an injection position, another position being a holding pressure position, and still another position being a transfer position.

10. An injection blow molding machine according to claim 9, with the only part of a rotation is one third of a rotation.

11. An injection blow molding machine for plastic containers, comprising at least one injection molding rotor having a plurality of injection molding units which are suppliable with plasticized plastic material and which include individual, splited mold cavities for preforms, a transfer rotor equipped with controlled transfer elements and used for transferring the individual preforms to a blow molding rotor including a plurality of blow molds for stretch blow molding the plastic containers, a removal rotor equipped with controlled removal elements, each mold cavity in the injection molding rotor being partly delimited by a split neck molding part which fits into each blow mold of the blow molding rotor, and wherein during use of the respective transfer element, a preform can, together with the neck molding part, be removed from a mold cavity substantially parallel to the operating plane and introduced in a blow mold, and upon use of a removal element, a container can, together with the neck molding part, be removed from the blow mold substantially parallel to the operating plane, and the neck molding part, which then no longer contains the container, can be reintroduced in a mold cavity, wherein a plasticizing screw rotates together with the injection molding rotor, wherein the transfer rotor and the removal rotor are coaxially combined such that they are positioned one on top of the other, and cam control means are provided for the transfer and removal elements, the cam control means having an integrated, alternate overtaking function of the elements in the direction of circulation.

12. An injection blow molding machine for plastic containers, comprising at least one injection molding rotor having a plurality of injection molding units which are suppliable with plasticized plastic material and which include individual, splited mold cavities for preforms, a transfer rotor equipped with controlled transfer elements and used for transferring the individual preforms to a blow molding rotor including a plurality of blow molds for stretch blow molding the plastic containers, a removal rotor equipped with controlled removal elements, the injection molding rotor, transfer rotor, blow molding rotor, and removal rotor being arranged in a substantially common operating plane, each mold cavity in the injection molding rotor being partly delimited by a split neck molding part which fits into each blow mold of the blow molding rotor, and wherein during use of the respective transfer element, a preform can, together with the neck molding part, be removed from a mold cavity substantially parallel to the operating plane and introduced in a blow mold, and upon use of a removal element, a container can, together with the neck molding part, be removed from the blow mold substantially parallel to the operating plane, and the neck molding part, which then no longer contains the container, can be reintroduced in a mold cavity; wherein the number of injection molding units on the injection molding rotor comprising more than one mold cavity corresponds to the number of blow molds on the blow molding rotor, and further comprising a control means with the aid of which only one mold cavity at a time can be moved relative to the injection molding rotor to an open transfer position, provided for each injection molding unit; and control means provided on the transfer rotor and the removal rotor for opening or closing each neck molding part removed in a closed condition with one of the preform or the container.

13. An injection blow molding machine according to claim 12, wherein for temporarily securing and transporting away each container, each removal element has associated therewith a controlled mandrel which is expandable when the neck molding part is being opened.

14. An injection blow molding machine according to claim 12, wherein the control means comprise cam control means.

15. A process for stretch blow molding plastic containers from preforms in a stretch blow molding machine, comprising successively forming individual preforms in an injection molding rotor by injection molding in mold cavities, transferring the preforms to a blow molding rotor having a plurality of blow molds, producing each preform in a split neck molding part of the mold cavity, transferring each perform in the neck molding part, and then, in the neck molding part, stretch blowing the perform into a container in the blow mold (11), and alternately introducing the neck molding part in a mold cavity and a blow mold; wherein the number of individual preforms produced in the injection molding rotor exceeds the number of blow molds on the blow molding rotor, and that, prior to being transferred to the blow molding rotor, each preform dwells on the injection molding rotor for a period corresponding to more than one full rotation of at least said injection molding rotor; and wherein during a full rotation of the injection molding rotor, each injection molding unit comprising three mold cavities is rotated from an injection position first by a third of a turn to a holding pressure position, during the next full rotation of the injection molding rotor rotated by another third of a turn to a transfer position, and during the next full rotation of the injection molding rotor rotated by another third of a turn back to the injection position.

16. A process for stretch blow molding plastic containers from preforms in a stretch blow molding machine, comprising successively forming individual preforms in an injection molding rotor by injection molding in mold cavities, transferring the preforms to a blow molding rotor having a plurality of blow molds, producing each preform in a split neck molding part of the mold cavity, transferring each perform in the neck molding part, and then, in the neck molding part, stretch blowing the perform into a container in the blow mold (11), and alternately introducing the neck molding part in a mold cavity and a blow mold; and wherein each preform and each container, respectively, is transferred and removed with the neck molding part by means of a clamp of a combined transfer and removal rotor with controlled neck molding part clamp pairs, and that the pairs of clamps are controlled in the direction of rotation of the rotor in such a way that the clamp constituting the rear clamp in the direction of circulation will overtake the other, front clamp of the pair once between the injection molding and blow molding rotors during each of the transfer and removal processes.

17. A process for stretch blow molding plastic containers from preforms in a stretch blow molding machine, comprising successively forming individual preforms in an injection molding rotor by injection molding in mold cavities, transferring the preforms to a blow molding rotor having a plurality of blow molds, producing each preform in a split neck molding part of the mold cavity, transferring each perform in the neck molding part, and then, in the neck molding part, stretch blowing the perform into a container in the blow mold (11), and alternately introducing the neck molding part in a mold cavity and a blow mold; and wherein in the blow mold, a blowing nozzle is attached directly to the neck molding part which is fixed in position in the blow mold or in a blow mold carrier.

\* \* \* \* \*